Figure 1:
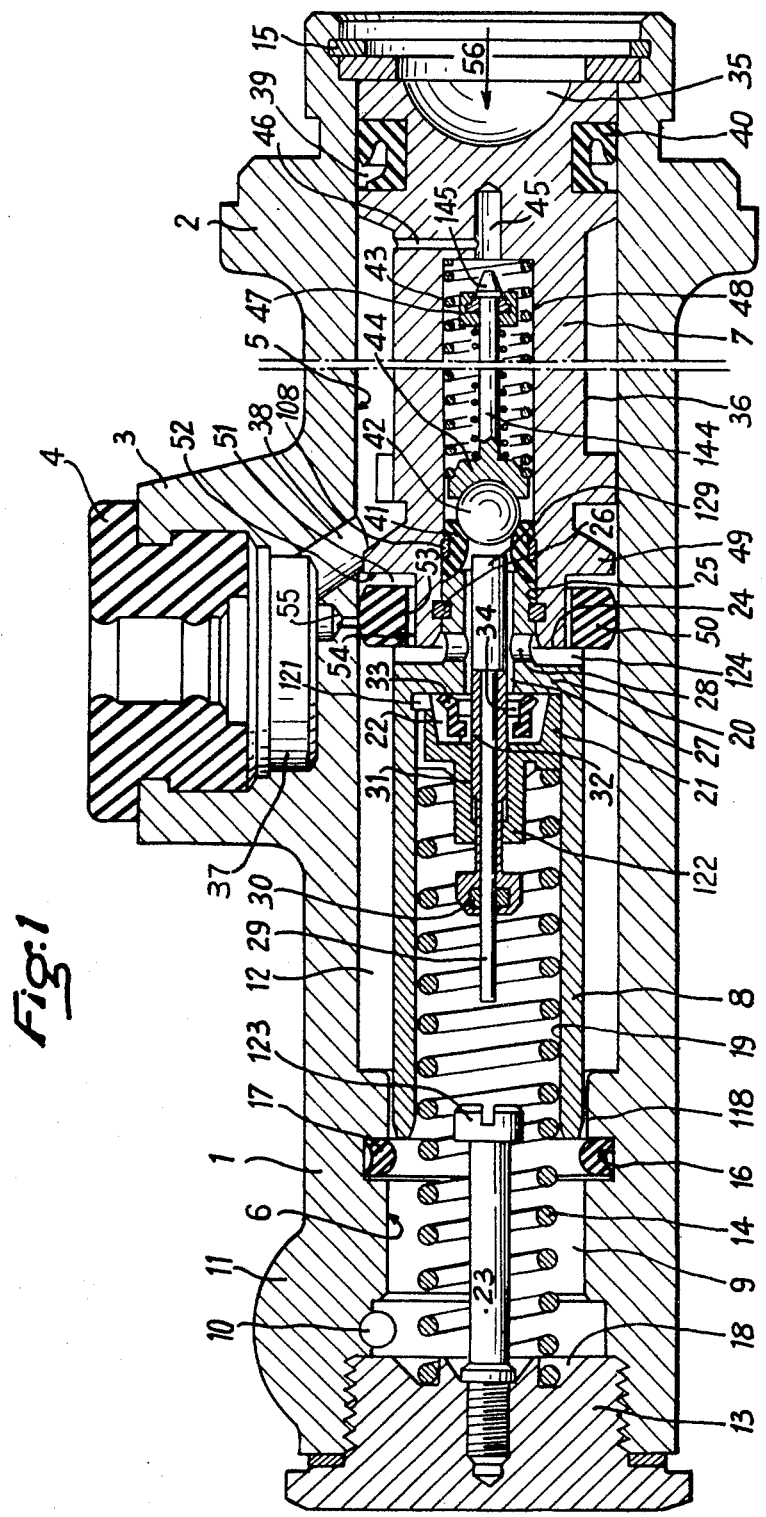

United States Patent [19]

Manzini

[11] 4,027,482
[45] June 7, 1977

[54] VARIABLE RATIO HYDRAULIC MASTER-CYLINDER

[75] Inventor: Ferruccio Manzini, Crema (CR), Italy

[73] Assignee: Abred Establishment, Italy

[22] Filed: May 27, 1975

[21] Appl. No.: 581,242

[30] Foreign Application Priority Data
June 17, 1974 Italy ................................. 68887/74

[52] U.S. Cl. .................................. 60/574; 60/578; 60/591
[51] Int. Cl.² .......................................... F15B 7/04
[58] Field of Search ............ 60/533, 574, 578, 557, 60/558, 563, 564, 565, 566, 591; 92/168, 130 R; 192/13 R; 188/347

[56] References Cited

UNITED STATES PATENTS

| | | | |
|---|---|---|---|
| 2,027,267 | 1/1936 | Bowen | 60/578 X |
| 2,299,211 | 10/1942 | Clench | 60/533 X |
| 2,343,900 | 3/1944 | Groves | 60/574 X |
| 2,941,368 | 6/1960 | Porter | 60/574 |
| 3,097,018 | 7/1963 | Stelzer | 60/574 X |
| 3,147,042 | 9/1964 | Stelzer | 60/574 X |
| 3,174,285 | 3/1965 | Stelzer | 60/578 X |
| 3,667,229 | 6/1972 | Cresto | 60/578 |
| 3,938,333 | 2/1976 | Mathues | 60/574 |

Primary Examiner—Edgar W. Geoghegan
Attorney, Agent, or Firm—Ken C. Decker; William N. Antonis

[57] ABSTRACT

The invention relates to a master-cylinder having a two-part cylinder, one part being of narrower diameter than the other, and a two-part piston slidable in the cylinder. Two pressure chambers are defined by the cylinder and the piston. Advance of the piston reduces the volume of both. One, the high pressure chamber feeds an external pressure system, and is itself fed by the other chamber through a valve system during an initial phase of the piston stroke. In a later phase the feed from the second in the first chamber ceases and instead the second chamber feeds the fluid reservoir through a control valve. Pressure-transmitting means such as a rod is arranged between the high pressure chamber and the control valve to open the control valve when the pressure in the high pressure chamber exceeds a predetermined value. A safety valve is provided downstream the control valve whereby, upon abnormal advance of the piston, terminating communication between the second chamber and the reservoir and again feeding the first chamber from the second chamber. The safety valve is actuated by a force transmitting element upon engagement with an abutment fixed relative to the master-cylinder housing.

9 Claims, 2 Drawing Figures

VARIABLE RATIO HYDRAULIC MASTER-CYLINDER

This invention relates to a variable ratio hydraulic master-cylinder particularly suitable for operating hydraulic brake system in a motor vehicle. In such devices it is obtained a first phase in the stroke of an operating member such as a pedal-controlled piston in which the pressure in an utilizing circuit increases comparatively gently and a later phase in which the increase is sharper.

There are known variables ratio master-cylinders including a housing having a stepped bore, with a smaller diameter section and larger diameter section, a stepped piston slidably mounted in the stepped bore to define in said smaller diameter section a high pressure chamber adapted to be connected to a utilizing circuit, and in said larger diameter section an annular low pressure chamber and a relief compartment adapted to be connected to a hydraulic fluid reservoir, a first passage in the said piston to connect through a first valve the low pressure chamber to the high pressure chamber, said first valve allowing fluid to flow from said low pressure chamber into said high pressure chamber but impeding fluid flow in the reverse direction, a second passage in the said piston to connect through a spring-biased second valve the low pressure chamber to the relief compartment, said second valve being moved in its opened position when the differential of pressure between the low pressure chamber and the relief compartment is above a predetermined level.

While such devices operate satisfactorily it may happen that the stepped piston reaches or approaches dangerously near its end-of-travel position if an abnormal volume of liquid is absorbed in the utilizing circuit due by way of example either to a fluid leakage in the circuit or to an overheating of the brake fluid. In such circumstances there are significant risks of putting the master-cylinder out of action due to lack of fluid necessary to pressurize the high pressure chamber.

According to the invention the master-cylinder of the type hereinbefore defined further comprises a third valve for interrupting fluid flow from said low pressure chamber to said relief compartment and control means for operating said third valve into its closed position when the stroke of the stepped piston from its rest position is increased above a predetermined value due to an insufficiency of hydraulic fluid in said high pressure chamber to pressurize said utilizing circuit.

According to a preferred embodiment of the invention the third valve is located in said second passage, said control means including a force transmitting element having one end projecting into said high pressure chamber and adapted to engage with an abutment in case of insufficiency of hydraulic fluid in said high pressure chamber to pressurize said utilizing circuit.

Figure 2:
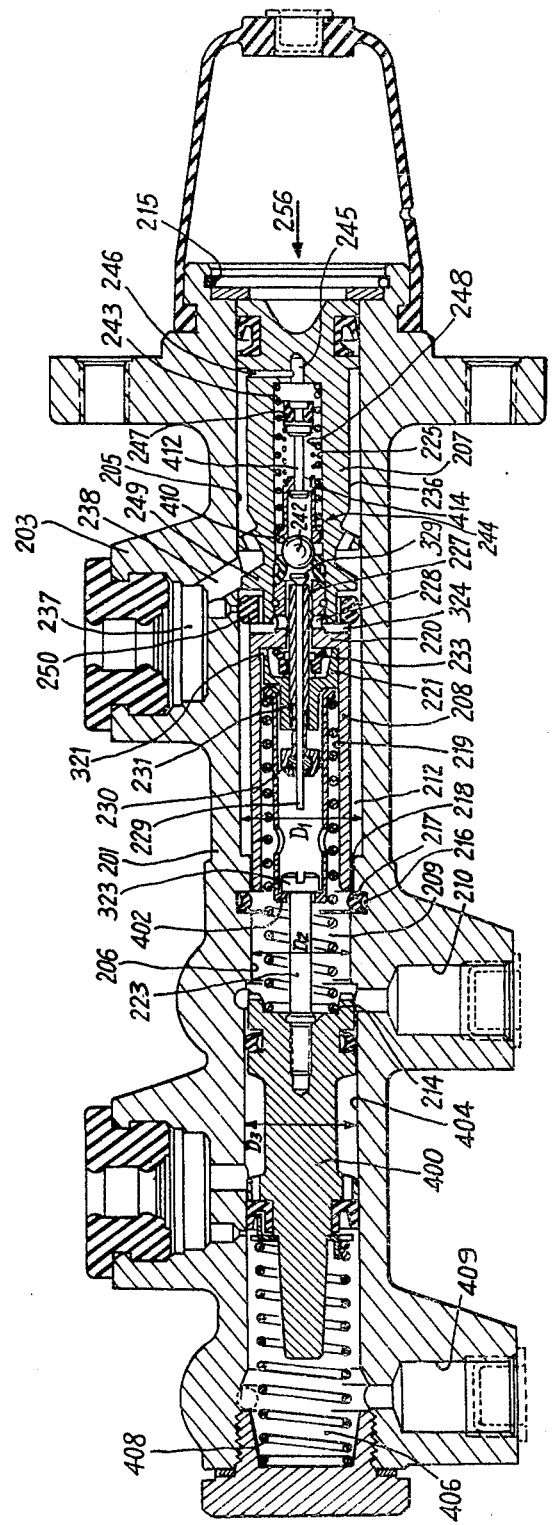

The invention is now described in reference to the accompanying drawings in which:

FIG. 1 is a longitudinal section of a variable ratio master-cylinder according to the invention and adapted to be used in a vehicle hydraulic braking circuit, and FIG. 2 is a longitudinal section of another embodiment of a variable ratio master-cylinder according to the invention and adapted to be used in a vehicle hydraulic braking circuit.

The master-cylinder shown in FIG. 1 comprises a housing 1 with a flange 2 for securing it to the motor vehicle, the housing comprising a boss 3 bearing a connection 4 for connecting the master-cylinder to an usual fluid storage reservoir (not shown). Housing 1 is provided with a stepped bore having larger and smaller diameter sections 5, 6 respectively. In this bore is slidably mounted in a stepped piston having a head part 8 of smaller diameter and a rear part 7 of larger diameter to define a high-pressure chamber 9 in the smaller diameter section 6 of the bore and an annular low pressure chamber 12. The high pressure chamber 9 is connected by a port 10 formed in a boss 11 to a hydraulic utilizing circuit such as the brake actuators of the vehicle. Chamber 9 is closed by a plug 13 formed with a recess 18 for centering and bearing a spring 14 tending to press rear part 7 of the piston against a locking ring 15 when the master-cylinder is in its rest condition as shown in FIG. 1.

An annular groove 16 having a rectangular cross-section is formed in the smaller diameter section 6 and houses a seal ring 17 which is adapted to sealingly cooperate with the head part 8 of the stepped piston upon movement of said stepped piston from its rest position. As shown in FIG. 1, when the stepped piston is in its rest position fluid communication between chambers 9 and 12 is maintained through an annular clearance between bore section 6 and the peripheral of head part 8. The head part 8 of the piston provided with a wide axial bore 19 which opens towards chamber 9 and is bounded at the opposite end by an end wall 20. A cup-shaped element 21 bears against wall 20 and cooperates therewith to define a compartment 22 which communicates with the remaining part of bore 19 via a radial slit 121. Element 21 has a reduced-diameter axial hub 122 which extend towards chamber 9. Reference 23 denotes an axial bolt screwed in plug 13, extending across chamber 9 towards piston part 8 and terminating in a head 123. The end of head part 8 remote from plug 13 has an annular radial shoulder 24 in which some radial slits 124 are formed. Shoulder 24 surrounds a substantially cylindrical protuberance 108 of piston part 8, extending inside an axial bore 25 formed in piston rear part 7 and bearing a resilient ring 26 which connects the aforementioned parts 7 and 8. An axial bore 27 which extends through wall 20 and protuberance 108, connects compartment 22 and therefore connects all the bore 19 of head part 8, to the part of bore 25 disposed opposite protuberance 108. The axial bore 27 also communicates with the radial slits 124 via passages 28 and houses the head 129 of a pin 29 adapted to move, with interposition of a retaining seal 30, in a sleeve 31. Sleeve 31 is guided in an axial through bore formed in the end wall of element 21 and hub 121. A lip seal 33 adapted to separate bore 25 from compartment 22 is disposed, with interposition of a bushing 32 made in synthetic material in that part of sleeve 31 which extends through compartment 22. When considering FIG. 1 the left end of sleeve 31 which projects into high pressure chamber 9, is expanded to provide abutment with the adjacent end of hub 121 whereby limiting relative movement between sleeve 31 and piston head 8. The right end of sleeve 31 abuts the head 129 of pin 29.

A metal ring 34 is adapted to prevent the lip of seal 33 extending through the clearance between bore 27 and sleeve 31, when acted upon by the pressure in the high-pressure chamber 9 when the master-cylinder is in operation. The seal 33 as hereinafter referred as a first valve, defines a check-valve allowing fluid to flow only from the low pressure chamber 12 into the high pressure chamber 9.

Piston rear part 7 has a central recess 35 adapted in known manner to receive the end of a thrust rod (not shown) which can be actuated by a brake pedal. The central region of part 7 is formed with an annular groove 36 defining a relief compartment and which is long enough independently of the position of the stepped piston in the stepped bore, to provide a permanent connection to the inner cavity 37 of boss 3 via passage 38. Rear part 7 also has a rear annular groove 39 receiving an annular lip seal 40.

A normally closed valve is disposed inside the axial bore 25 formed in part 7 and near the end of protuberance 108 of head part 8. This second valve 41, 42 has a seat comprising a bushing 41 made of resilient material, e.g. rubber, and a ball 42 normally pressed by a spring 43 inside the circular section part of the bushing, which has a smaller-diameter than that of the ball. Spring 43 bears against the end of bore 25 and acts on ball 42 via a disc shaped fixture 44 formed at the side of the ball with a recess in the form of a spherical cap having a radius greater than that of the ball. The part of bore 25 which receives spring 43, fixture 44 and ball 42 communicates with annular groove 36 via a short axial passage 45 having a relatively small diameter and a narrow radial passage 46 forming a constriction. The opening of passage 45 inside bore 25 is controlled by a third valve 47 which is slidably mounted on a stem 144 which is coaxial and integral with the disc portion of fixture 44. Valve 47 is permanently pressed against head 145 of stem 144 under the action of a spring 48 to define a retractable resilient connection. The length of stem 144 up to head 145 is chosen so that seal 47 does not separate passage 45 from the interior of bore 25 when first valve 41, 42 opens so that the liquid can flow through bore 25 during normal operation of the master-cylinder.

Head 49 of part 7 is formed with an annular groove which opens in the direction of part 8 and receives an annular seal 50. The purpose of seal 50 is to separate the low-pressure chamber 12 from passage 38 communicating with cavity 37 in boss 3, when the stepped piston 7, 8 moves forward during braking.

Seal 50, which in the example has a substantially rectangular shape modified by an arcuate external outline, adheres with slight pressure to the wall of part 5 of the stepped bore. When the device is in the inoperative position shown in FIG. 1, seal 50 forms a radial passage wih the clearance 52 of head 49 facing chamber 12, and an axial passage 53 with the periphery 54 of the reduced-diameter part of head 49 adjacent radial clearance 24. Reference 55 denotes a conventional compensating bore.

It should be pointed out that radial slits 124, aperatures 28, the left part of bore 27, inner compartment 22 and slit 121 define a first fluid passage connecting the low pressure and high pressure chambers, and that radial slits 124, the right part of bore 27, bores 25 and 45, passage 46 define a second fluid passage connecting the low pressure chamber 12 and the relief compartment 36. The first passage is provided with the first valve 33 whereas the second passage is provided with the second valve 41, 42.

The device as hereibefore described operates as follows:

When master-cylinder is in the inoperative position shown in FIG. 1, the inner cavity 37 of boss 3 is connected via passages 38, 51, 53 and 124 to the low-pressure chamber 12 which in turn is connected via the annular clearance 118 to the high pressure chamber 9. The lip seal 33 breaks the connection between bores 19 and 27 formed in parts 8, 108 of the stepped piston. Valve 41, 42 is also closed.

When the stepped piston moves in the direction of arrow 56, seal 50 moves relative to head 49 until it no longer adheres to the radial clearance 52, thus breaking the connection between the low pressure chamber 12 and the inner cavity 37 of boss 3 connected to the storage reservoir. The forward movement of piston 7, 8 also closes passage 118 so that liquid travels from the low pressure chamber 12 to the high pressure chamber 9 via the first valve comprising seal 33. When the pressure in the low pressure chamber 12 reaches a value such that the thrust on ball 42 is sufficient to overcome the tension of spring 43, liquid stops flowing from the low pressure chamber 12 to the high pressure chamber 9, since the pressure in the low pressure chamber cannot increase further since valve 41, 42 is maintained open by the sleeve 31 and pin 29 and liquid will flow back from chamber 12 to the storage reservoir. Seal 33 also breaks the connection between bores 27 and 19, owing to the pressure which henceforth prevails in the high pressure chamber 9. Owinng to the constriction 46 in the path of the liquid when it flows from chamber 12 to the storage reservoir, the master-cylinder operates correctly even if the brakes are suddenly applied. It should be pointed out that in this case, seal 47 is at a distance from the end of bore 25 formed in part 7 of the stepped cylinder, the distance being sufficient for liquid to flow through passage 45 towards constriction 46. To this respect the movement of the sleeve 31 towards the rear part 7 is limited by an engagement of the sleeve 31 with the hub 121. Furthermore the cross sectional area of the end of the pin 29 which projects into the high pressure chamber 9 is chosen small enough with respect to the load of spring 43 to avoid during normal braking operation disengagement of the sleeve 31 and the head 129.

If, for any reason, an abnormal amount of liquid is absorbed by the utilizing brake circuit and stepped piston 7, 8 moves too far towards the end of pin 29 abuts against head 123 of the bolt 23 secured to the plug 13. Further movement of piston 7, 8 immediately moves pin 29, ball 42, fixture 44 and stem 144 bearing seal 47, against the action of spring 43, towards the end wall of bore 25 until the seal 47 disconnects bore 25 from passage 45, thus disconnecting the low pressure chamber 12 from the storage reservoir, so that additional liquid can be introduced from the low pressure chamber 12 into the high pressure chamber 9 and to the brake utilizing circuit. This additional liquid is supplied by reducing the volumes of chambers 9 and 12 simultaneously. The stepped piston can advance further, since seal 47 can move with respect to stem 144 against the tension of spring 48, due to the existence of the retractable connection.

At the end of the braking operation, the stepped piston 7, 8 returns in known manner, under the action of spring 14, to its rest position. During this movement of piston, the annular seal 50 also moves relative to its seat so as to re-open communication between the low pressure chamber 12 and the storage reservoir via passages 124, 53, 38 and 37. When piston 7, 8 has returned to its original position, the connection is restored between chambers 9 and 12, via the annular clearance 118.

It can be understood that the structure comprising an abutment defined by the screw 23 secured to the housing 1, the pin 29 acting as a force transmitting element, the ball 42, the fixture 44 and the retractable connection between the fixture 44 and the third valve 47 define control means for operating the latter into its closed position when the stroke of the stepped piston from its rest position is increased above a predetermined value due to an insufficiency of hydraulic fluid to pressurize the utilizing circuit.

Of course, without altering the basic features of the invention, details can be widely varied from those described and illustrated by way of example, without departing from the scope of the invention.

For example, the invention can be applied either to a master-cylinder having a single outlet or to a master-cylinder of the tandem type so as to actuate two separate brake circuits as the one shown in FIG. 2. In this case the elements similar to those shown in FIG. 1 will not be again described and will bear the same reference numeral with addition of 200.

The master-cylinder shown in FIG. 2 is longer and the bolt 223, instead of being borne by plug 13, is screwed to the rear end of a floating piston 400 which also abuts the spring 214 acting on the stepped piston 207, 208 through a conventional abutting sleeve 402 and member 321.

According to various embodiments of the invention the floating piston 400 may slide either in the smaller diameter section 206 or as shown in FIG. 2 in a third section 404 of the main bore of the master-cylinder, the diameter D3 of which being larger than that D2 of the smaller diameter section 206 and not more than that D1 of the larger diameter section 205. In front of piston 400 is a front chamber 406 which is adapted to be connected through port 409 to another independent braking circuit. A spring 408 biases both pistons 400 and 207, 208 in their rest position as shown.

Another difference with the first described embodiment of the invention resides in the fixture 244 which consists of a sleeve 410 abutting ball 242 and of which the inner bore receives the head of a stem 412 secured to the third valve element 247. The sleeve 410 is provided with a lateral aperture 414 for introducing the last-named stem into the inner bore. Such a structure including spring 248 defines a retractable resilient connection between the sleeve 410 and the valve element 247.

The above described tandem master-cylinder operates as substantially as the first embodiment of the invention and its mode of operation will not be explained in details. However assuming that there is a leakage in the circuit associated with high pressure chamber 209, the closure of the third valve happens by engagement of the pin 229 with the screw 223 which is in a fixed position with respect to the housing 201 due to the existence of significant fluid pressure in the front chamber 406. Then in operation the screw 223 associated with the floating piston 400 define the abutment for the force transmitting element which consists of the pin 229. Assuming now a leakage in the circuit associated with the front chamber 406, this leakage will induce a movement of the floating piston towards the left of FIG. 2. Due to the difference between diameter D3 and D2 this movement immediately induces a reduction of pressure in high-pressure chamber 209 and an artificial increase of fluid requirement for pressurizing the utilizing circuit associated with chamber 209. Consequently to compensate this fluid insufficiency the piston 207, 208 moves further to the left of FIG. 2. However, the stroke of the piston head 208 is greater than that of the floating piston 402 in accordance with the diameter ratio D3/D2 and the two pistons 208 and 400 come closer one with respect to the other until the stroke of the stepped piston from its rest position is above a predetermined value which corresponds to the engagement of the pin 229 with screw 223 and therefore closing the third valve 247. Further movement of the stepped piston permits supply of additional fluid in high-pressure chamber 209 from low pressure chamber 212 without risk of insufficiency since diameter D3 is at more equal to D1.

I claim:

1. A variable ratio hydraulic master-cylinder including a housing having a stepped bore, with a smaller diameter section and larger diameter section, a stepped piston slidably mounted in the stepped bore to define in said smaller diameter section a high pressure chamber adapted to be connected to a utilizing circuit and in said larger diameter section an annular low pressure chamber and a relief compartment adapted to be connected to a hydraulic fluid reservoir, a first passage in the said piston to connect through a first valve the low pressure chamber to the high pressure chamber, said first valve allowing fluid to flow from said low pressure chamber into said high pressure chamber but impeding fluid flow in the reverse direction, a second passage in the said piston to connect through a spring-biased second valve the low pressure chamber to the relief compartment, said second valve being moved in its opened position when the differential of pressures between the low pressure chamber and the relief compartment is above a predetermined level, characterized in further including a third valve for interrupting fluid flow from said low pressure chamber into said reservoir and control means for operating said third valve into its closed position when the stroke of the stepped piston from its rest position is increased above a predetermined length due to an insufficiency of hydraulic fluid in said high pressure chamber to pressurize said utilizing circuit, said third valve means remaining in its closed position when the stepped piston moves through a stroke less than the predetermined length, but sufficient to generate a pressure level capable of actuating the vehicle brakes.

2. A master-cylinder according to claim 1 characterized in that said third valve is located in said second passage, said control means including a force transmitting element having one end projecting into said high pressure chamber and adapted to engage with an abutment in case of insufficiency of hydraulic fluid in said high pressure chamber to pressurize said utilizing circuit.

3. A master cylinder according to claim 2 wherein the other end of the force transmitting element projects through said first passage into said second to engage the movable member of said second valve.

4. A master-cylinder according to claim 3, wherein said movable member of said second valve is a part of said control means, said third valve including a valve element mounted on a fixture through a retractable resilient connection, said fixture being biased in engagement with the movable member of said second valve by a spring abutting on said stepped piston.

5. A master-cylinder according to claim 4, wherein said fixture is a sleeve, the inner bore of which receiving the head of a stem secured to said valve element, said sleeve being provided with a lateral aperture for introducing said head within said inner bore.

6. A master-cylinder according to claim 5, wherein said force transmitting element is a pin slidably mounted within a sleeve having opposite ends projecting into said high pressure chamber and said first passage, said other end of said force transmitting element being expanded to be engaged by said sleeve, stop means connected to said stepped piston being provided to limit the displacements of said sleeve towards said second valve.

7. A master-cylinder according to anyone of claim 2 wherein said abutment is fixed to said housing.

8. A master-cylinder according to anyone of claim 2 wherein said master-cylinder is of the tandem type having a floating piston separating said high pressure chamber from a front chamber, said abutment being fixed to said floating piston.

9. A master cylinder according to claim 8, wherein said floating piston is sliding in a third section of said bore, the diameter of said third section being larger than the diameter of said smaller diameter section and not more than the diameter of said larger diameter.

* * * * *